United States Patent [19]
Hallock, III

[11] Patent Number: 5,269,727
[45] Date of Patent: Dec. 14, 1993

[54] GEAR HUB LOCK RING CHAIN GUARD

[76] Inventor: Orrin S. Hallock, III, 33 Roberts Rd., Cambridge, Mass. 02138

[21] Appl. No.: 950,001

[22] Filed: Sep. 24, 1992

[51] Int. Cl.$^5$ .............................................. F16H 7/18
[52] U.S. Cl. ................................................... 474/144
[58] Field of Search ................................ 474/144–147, 474/140

[56] References Cited

U.S. PATENT DOCUMENTS

| 4,289,490 | 9/1981 | Nagano | 474/144 |
| 4,905,541 | 3/1990 | Alan | 474/144 X |
| 5,116,285 | 5/1992 | Wahl | 474/144 |

Primary Examiner—Thuy M. Bui

[57] ABSTRACT

In accordance with the present invention there is provided a a combination lock ring and chain guard for the outer most gear cog of a multi gear gear hub of the type retained on the drivewheel of a bicycle by a lock ring; said combination lock ring and chain guard comprised of an annular member 2 having an internally threaded central opening 1 for mounting the guard on the drive side of a bicycle drivewheel hub to the outside of a multi gear freewheel mounted on the drivewheel hub, the perimeteral edge of the annular member provides a high gear overshift chain guard supported to the outside, parallel to, and above and adjacent the path of the teeth of the outer most gear cog of the multi gear bicycle gear hub.

2 Claims, 1 Drawing Sheet

GEAR HUB LOCK RING CHAIN GUARD

TECHNICAL FIELD

The present invention relates to freewheels secured to a bicycle drivewheel by a lock ring, and to chain guards for the outermost or highest gear of a bicycle freewheel.

BACKGROUND ART

Chain guards for the outer most gear cog of multi gear bicycles are not common stock items appearing on showroom bicycles and are one of the most over looked safety features, known to people knowledgeable in the art of bicycle design and manufacture. Though not unknown, few chain guards for the outer most gear cog of multi gear gear hubs have been produced for public sale.

DISCLOSURE OF THE INVENTION

The present invention provides a centrally threaded annular member comprising a combination lock ring and chain guard for the outer most gear cog of a bicycle free wheel retained on the drivewheel hub of a bicycle by a lock ring. The outer perimeteral edge of the combination lock ring chain guard is supported outward above and adjacent the path of the teeth of the outer most gear cog of a multigear gear hub when the central treading of the annular member is tightened on the threading of a bicycle drivewheel hub to the outside of a freewheel seated on the drivewheel hub.

BRIEF DESCRIPTION OF DRAWINGS

Referring now to the drawing forming a part of the present specification, FIG. 1 provides a perspective view of a possible embodiment of the present invention.

BEST MODE FOR CARRYING OUT THE INVENTION

Figure 1:
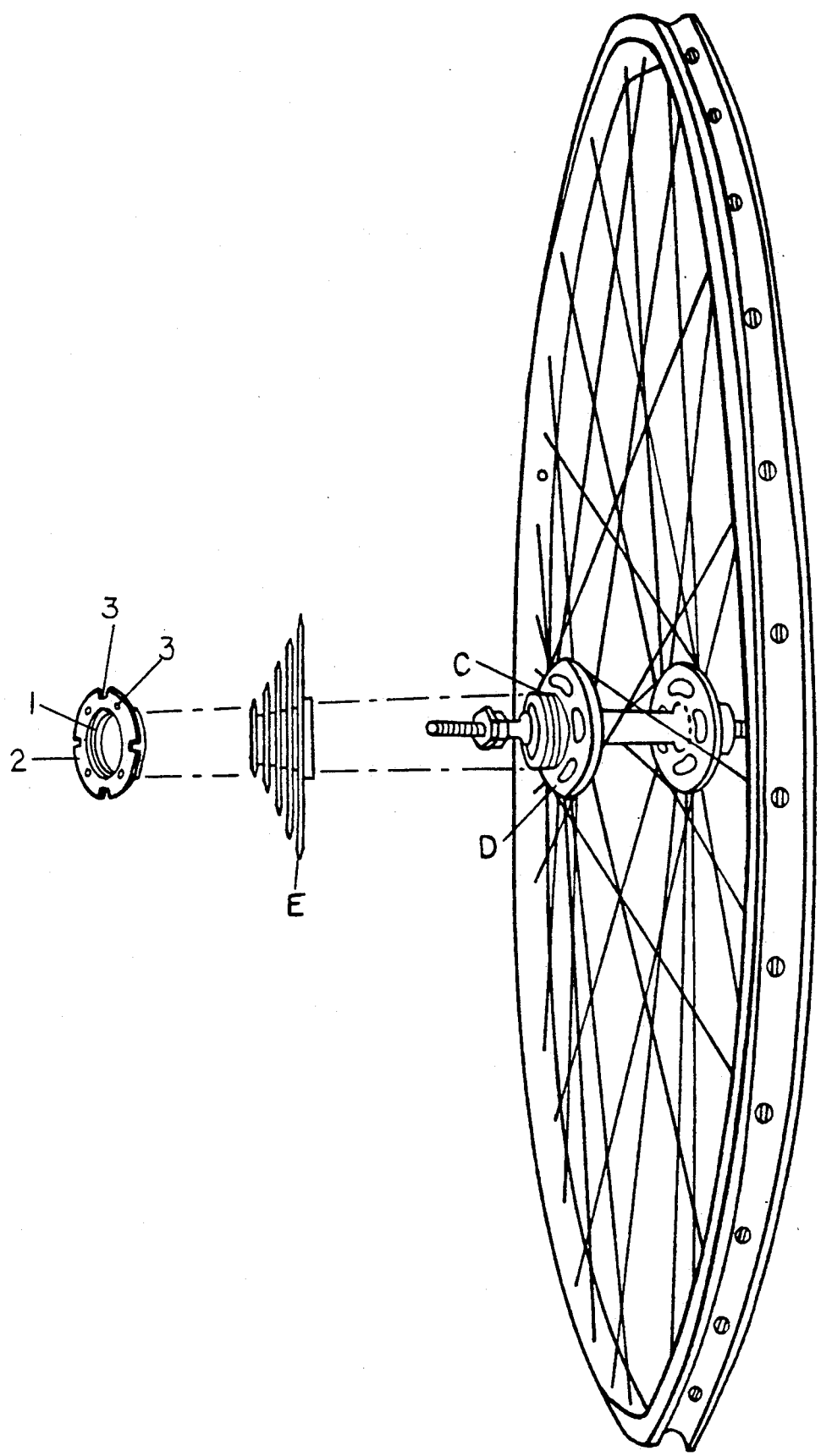

Referring now to FIG. 1 there is shown a combination lock ring and chain guard comprised of a centrally threaded 1 annular member 2 formed of metal. The outer perferial edge and the body of the annular member having notching and perforations 3 for removing and installing the annular member with a chisel or other tools. The central threading of the combination lock ring chain guard for threading on to the threading C of a bicycle gear hub D to the outside of a multi gear bicycle freewheel E mounted on the gear hub. The chain guard portions of the combination lock ring and chain guard are supported above and adjacent the path of the teeth of the outer most gear of a multi gear gear hub mounted to the hub of the drivewheel of the bicycle.

The present invention possesses the advantage of providing a combination lock ring and chain guard for outer most gear cog of the drivewheel of a bicycle of the type retained on a bicycle gear hub by a lock ring.

I claim:

1. A lockring and chain guard for a multi gear bicycle gear hub of the type retained on a bicycle drive wheel hub by a lockring, said lockring and chain guard comprised of an annular member formed substantially of a solid substance, said annular member having a central opening and an outer edge, said central opening having mounting means, for mounting said guard on a drive wheel hub to the outside of a multi gear hub mounted on said drive wheel hub thus retaining said multi gear hub thereon said drive wheel hub, said multi gear hub supporting at least an inner and outer gear cog, the outer edge of said guard at least larger than said outer most gear cog.

2. The structure of claim 1 wherein the said central opening thereof is formed with internal threading.

* * * * *